(12) United States Patent
Ray et al.

(10) Patent No.: US 7,986,408 B2
(45) Date of Patent: Jul. 26, 2011

(54) APPARATUS AND METHOD FOR IN-FLIGHT DETECTION OF AIRBORNE WATER DROPLETS AND ICE CRYSTALS

(75) Inventors: Mark D. Ray, Burnsville, MN (US); Michael P. Nesnidal, Shakopee, MN (US); David M. Socha, Champlin, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 322 days.

(21) Appl. No.: 12/264,956

(22) Filed: Nov. 5, 2008

(65) Prior Publication Data

US 2010/0110431 A1    May 6, 2010

(51) Int. Cl.
*G01J 4/00* (2006.01)
(52) U.S. Cl. ......................... 356/369; 356/342
(58) Field of Classification Search .................. None
See application file for complete search history.

(56) References Cited

U.S. PATENT DOCUMENTS

| | | | |
|---|---|---|---|
| 5,557,040 A * | 9/1996 | Inenaga et al. ........... 250/559.09 |
| 5,617,076 A | 4/1997 | Stern | |
| 5,838,239 A * | 11/1998 | Stern et al. ..................... 356/369 |
| 5,929,443 A * | 7/1999 | Alfano et al. .............. 250/341.3 |
| 6,091,335 A | 7/2000 | Breda et al. | |
| 6,377,202 B1 | 4/2002 | Kropfli et al. | |
| 6,377,207 B1 | 4/2002 | Solheim et al. | |
| 6,819,265 B2 | 11/2004 | Jamieson et al. | |
| 7,339,670 B2 | 3/2008 | Carrig et al. | |
| 7,370,525 B1 | 5/2008 | Zhao et al. | |
| 7,652,584 B2 * | 1/2010 | Fridthjof ....................... 340/580 |
| 7,708,944 B1 * | 5/2010 | Sadik et al. .................. 422/412 |
| 2010/0280765 A1 * | 11/2010 | Marquardt et al. ........... 356/342 |

OTHER PUBLICATIONS

Hu, Yong-X. et al., "Discriminating between spherical and non-spherical scatterers with lidar using circular polarization: a theoretical study," Journal of Quantitative Spectroscopy & Radiative Transfer 79-80 (2003) 757-764.
Kelly, Emma, "Swan's ice detector follows from windshear system," Flight International News Article, May 29, 2008.

* cited by examiner

*Primary Examiner* — Gregory J Toatley
*Assistant Examiner* — Juan D Valentin
(74) *Attorney, Agent, or Firm* — Womble Carlyle (57) ABSTRACT

A device for optically detecting and distinguishing airborne liquid water droplets and ice crystals includes an illumination portion and a detection portion. The illumination portion outputs a circularly polarized illuminating beam. The detection portion receives circularly polarized backscattered light from moisture in the cloud, in response to the illuminating beam. The circularly polarized backscattered light is passed through a circular polarizer to convert it into linearly polarized backscattered light, which is split into two components. Each of the two components is optionally subject to further linear polarization to filter out any leakage-type orthogonal polarization. The two components are then optically detected and the resulting detection signals are used to calculate one or more parameters reflective of the presence or absence of airborne ice crystals and/or water droplets.

13 Claims, 4 Drawing Sheets

APPARATUS AND METHOD FOR IN-FLIGHT DETECTION OF AIRBORNE WATER DROPLETS AND ICE CRYSTALS

CROSS REFERENCE TO RELATED APPLICATIONS

None.

BACKGROUND OF THE INVENTION

1. Field of the Invention

The present invention concerns in-flight sensors on board aircraft for detecting airborne liquid water droplets and ice crystals.

2. Background

An in-flight ice and icing conditions detection system should be able to distinguish between airborne liquid water droplets and ice crystals. Prior art approaches to distinguishing liquid water droplets from ice crystals measure the depolarization of the backscattered light from a polarized laser beam.

U.S. Pat. No. 7,370,525 is directed to a dual channel inflight ice detection system which detects ice accretion on an aircraft surface. The system illuminates an ice collecting surface mounted on an aircraft with linearly polarized light. The backscattered light is acquired in two light conductors, one with polarization sensitivity aligned to the transmitted light and the second with polarization sensitivity orthogonal to the first. The presence of ice is determined by the change in the ratio of light intensities in the two light conductors.

U.S. Pat. No. 6,819,265 is directed to an ice detection warning system mountable on-board an aircraft for in-flight monitoring of the airspace ahead of the aircraft. The system comprises: a first plurality of optical elements configured to direct a pulsed laser beam at a first wavelength from a laser source into the airspace ahead of the aircraft; a second plurality of optical elements configured to separate received backscattered light from the laser beam into a plurality of pre-determined wavelengths; a plurality of light detectors for detecting the light of the separated plurality of wavelengths, respectively, and generating respectively corresponding plurality of electrical signals representative of the light detected thereby; and a processor for processing the plurality of electrical signals to determine if airspace conditions ahead of the aircraft are likely to cause ice accretion on the surface of the aircraft, and for generating a warning indicative thereof.

U.S. Pat. No. 6,091,335 is directed to an optical device on board an aircraft for detecting icing conditions outside the boundary layer of the aircraft. The device, which also employs linearly polarized light, includes an optical beam emitter to create at least one illuminated external volume of measurement through which there circulates a flow of air charged with water particles. Also included is a collector optical system for the collection of at least a part of the light beam back-scattered by the water droplets (the external volume of measurement being located on the optical axis of the collector optical system). A photodetector is used to detect backscattered light, while a signal processor processes the signal delivered by the photodetector to compute the severity of the icing conditions. The collector optical system further comprises means for differentiating between liquid water droplets and ice crystals by analyzing the polarization of the light collected. Information is provided for the calculated severity of the icing conditions.

Figure 1:
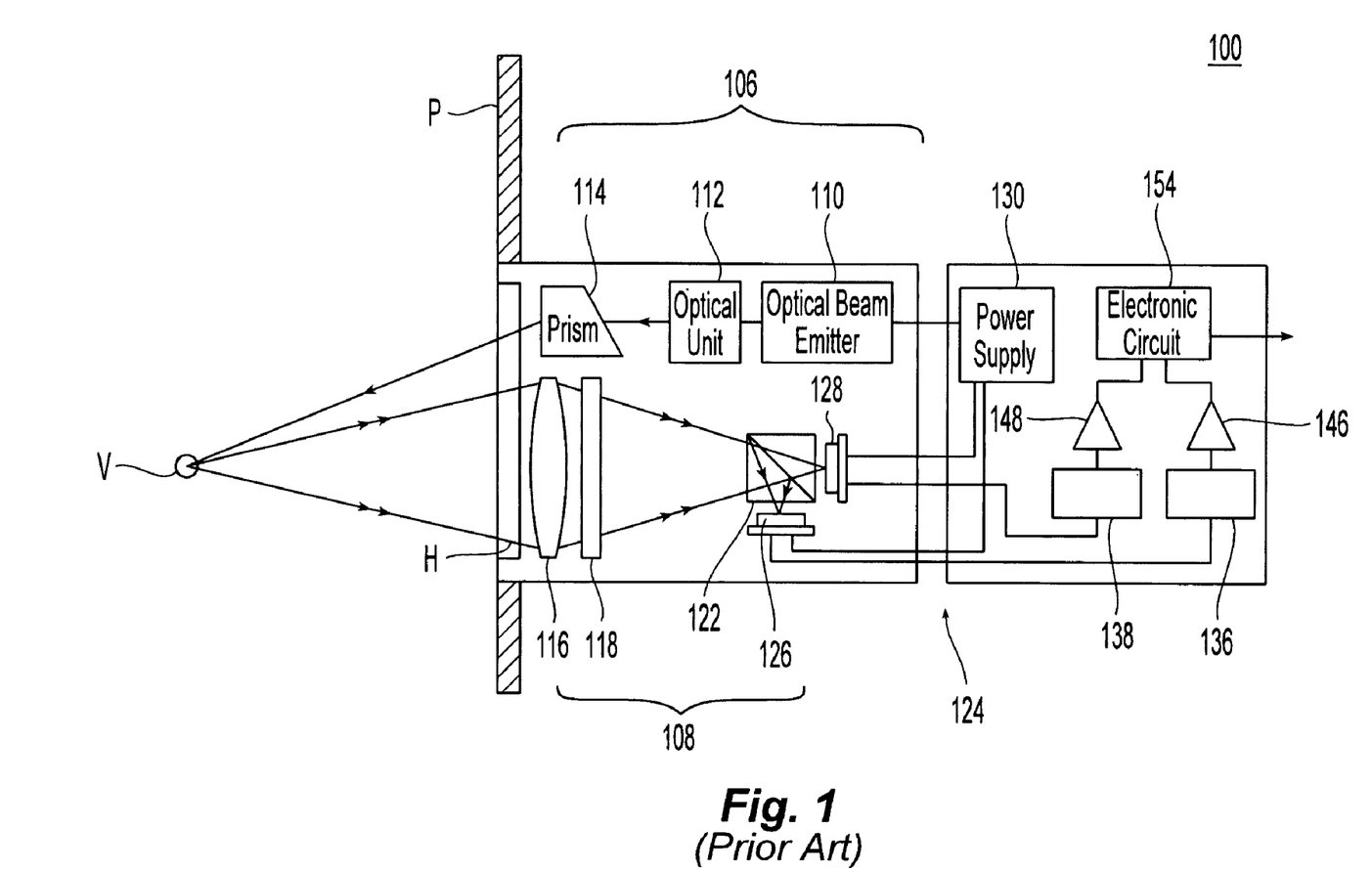
FIG. 1 shows a prior art optical device for the detection of icing conditions on aircraft.

FIG. 1 shows a prior art optical device 100 made in accordance with the '335 patent. The device 100 includes an emission subsystem 106, a collector optical subsystem 108, a photodetection subsystem 124, and electronic circuitry 154. A power supply 130 provides the power needed for the emission subsystem 106 and the photodetection subsystem 124 and the electronic circuitry 154.

The emission subsystem 106 comprises a polarized laser diode 110 (e.g., emitting in the visible or near infra-red range (between 400 nm and 1500 nm)), a collimation optical unit 112 and a deflection prism 114, so as to create an illuminated volume of measurement V on the optical axis AA' of the collector optical system, through the porthole window H of the aircraft, located on the skin P of the aircraft. Typically, the emission means can emit light outside the skin of the aircraft, at a distance of approximately 100 mm. This makes it possible to carry out measurements outside the boundary layer of the aircraft (the area in which measurements would not be representative) while preserving a reasonable level of emitted power, a volume of polarized light whose dimensions are smaller than one mm, namely a value below which it can be shown that the probability of having two particles simultaneously in the volume of measurement is almost zero.

The collector optical subsystem 108 comprises a focusing optical unit 116 with a small diameter (10 to 20 mm) and a narrow-band optical filter module 118 (working typically in the bandwidth range of about 10 nm) that enables the filtering of solar illumination. The collector optical system may also comprise a polarization separator 122, which may be either a polarizing separator cube or a birefringent separator.

The photodetection subsystem 124 comprises two photodetectors 126 and 128 which recover cross-polarized optical beams. The polarization of the optical beam backscattered by the liquid water droplets is identical to that of the incidental optical beam. A first signal $I_{1L}$ relating to this backscattered optical beam is recovered at a photodetector 126. On the other hand, the photodetector 128 recovers a second signal, which is real and relates to a cross polarization ($I_{2L}=0$).

The polarization of the optical beam backscattered by the ice crystals is modified in relation to that of the incidental optical beam. The two photodetectors 126 and 128 recover signals $I_{1S}$ and $I_{2S}$, respectively, when a particle passes into the volume of measurement. The output of the first photodetector 126 passes though a first filter 136 and then a first variable gain amplifier 146. Similarly, the output of the second photodetector is passed through a second filter 146 and then a second variable gain amplifier 148.

The electronic circuitry 154 carries out the mathematical processing of the received signals such as summation, comparison of the two channels, computation of the severity of the icing conditions, etc. The electronic circuitry 154 can compute the total volume of the droplets of water that pass per unit of time by summing the signals obtained on the two channels. It also computes the "de-polarization" by computing the ratio between the signals of the two channels and thus determines the state (i.e. liquid water versus ice water) of the particles.

U.S. Pat. No. 5,617,076 is directed to a system for detecting de-polarizing substance, such as ice or snow, on a surface which specularly reflects light. The '076 patent discloses that circularly polarized light may be used in conjunction with such a system.

SUMMARY OF THE INVENTION

In one aspect, the invention is directed to an airborne water droplet and ice crystal sensor which employs circular polarization and comprises an illumination portion and a detection portion. The illumination portion comprises a first optical beam emitter configured to output a light beam, a first linear polarizer configured to receive the light beam and output a linearly polarized illuminating beam, and a first circular polarization element configured to receive the linearly polarized illuminating beam and output a circularly polarized illuminating beam. The detection portion comprises a window configured to permit circularly polarized backscattered light to pass therethrough, a second circular polarization element configured to receive the circularly polarized backscattered light that has passed through the window and output linearly polarized backscattered light, a first polarizing beam splitter configured to split the linearly polarized backscattered light into a first component linearly polarized backscattered light and a second component linearly polarized backscattered light, a first light detector configured to detect the first component linearly polarized backscattered light and output a first signal in response thereto, and a second light detector configured to detect the second component linearly polarized backscattered light and output a second signal in response thereto.

In another aspect, the invention is directed to a method of detecting ice crystals in a cloud from an aircraft. The method comprises emitting a circularly polarized illuminating beam within a cloud, receiving circularly polarized backscattered light from moisture within the cloud, in response to the illuminating beam, passing said circularly polarized backscattered light through a circular polarizer to form linearly polarized backscattered light, splitting said linearly polarized backscattered light into first component linearly polarized backscattered light and second component linearly polarized backscattered light, optically detecting said first component linearly polarized backscattered light and outputting a first detection signal in response thereto, and optically detecting said second component linearly polarized backscattered light and outputting a second detection signal in response thereto, and calculating at least one parameter reflective of the presence of ice in the cloud, based on said first and second detection signals.

In still another aspect, the invention is directed to an airborne water droplet and ice crystal sensor which also comprises an illumination portion and a detection portion. The illumination portion comprises a first optical beam emitter configured to output a linearly polarized illuminating beam and a first reflector configured to reflect the linearly polarized illuminating beam along an optical illumination axis of the sensor. The detection portion comprises a window configured to permit linearly polarized backscattered light to pass therethrough, a beam splitter configured to split the linearly polarized backscattered light into first component linearly polarized backscattered light and second component linearly polarized backscattered light, a first light detector configured to detect the first component linearly polarized backscattered light; and a second light detector configured to detect the second component linearly polarized backscattered light.

DETAILED DESCRIPTION OF THE INVENTION

The aforementioned U.S. Pat. Nos. 6,091,335, 6,819,265, 5,370,525 and 5,617,076 are incorporated by reference herein, to the extent necessary to understand the present invention.

In general, direct reflections of an illuminating light, such as laser light, from spherical water droplets are purely specular while those from ice crystals are not.

Water droplets ideally act like perfect mirrors and scatter the reflected laser light back on itself without altering the polarization state. If the incident light is horizontally or vertically polarized, the reflected light is likewise horizontally or vertically polarized. Therefore, a backscatter polarization with a relatively low degree of depolarization is indicative of a liquid water cloud. In the case of circular polarization, the direction of the rotating electric field does not change upon reflection, but the change in Poynting vector of the incident wave changes the sense of circular polarization. Hence, an incident beam which is right hand circularly polarized becomes left hand circularly polarized upon reflection, and vice versa.

Ice crystals, on the other hand, tend to alter the polarization state of reflected light, due in part to multiple internal reflections from their facets and in part to the birefringence of ice. Reflected light from airborne ice crystals becomes a mixture of two orthogonal polarization states when the incident light is a pure polarization state. By monitoring both orthogonal polarization states of the backscattered light, it is possible to distinguish water droplets from ice crystals.

Unfortunately, this simple concept becomes complicated whenever a laser beam penetrates a soft, but optically thick target, such as a cloud. It is understood that in the present context, a "cloud" encompasses not only the familiar formations that are visible to a naked eye, but may also include groups of water droplets and masses of ice crystals found at high altitudes, which may be the result of updrafts from lower clouds, such as cumulus clouds.

In addition to direct backscatter, the light undergoes significant small-angle forward scattering whenever the ratio of water droplet size to laser wavelength is near or slight greater than one. This process is known as Mie scattering. In most clouds, the water droplets range from 1 to 10 microns, while typical visible and near-infrared wavelengths range from 0.4 to 2.0 microns. Airborne water droplets produce Mie scattering for visible and near-infrared optical sensors. The forward-scattered light may eventually scatter back towards the optical receiver that is coincident with the projected laser beam. When it does, its polarization state will be altered beyond what it would have been if the light had reflected from a water droplet directly, without experiencing forward-scattering. This series of forward scattering events accompanied by a single backscatter is known as multiple scattering, and it produces a de-polarized signal that is quite unlike the signal produced by single scattering event from a spherical water droplet.

Figure 2:
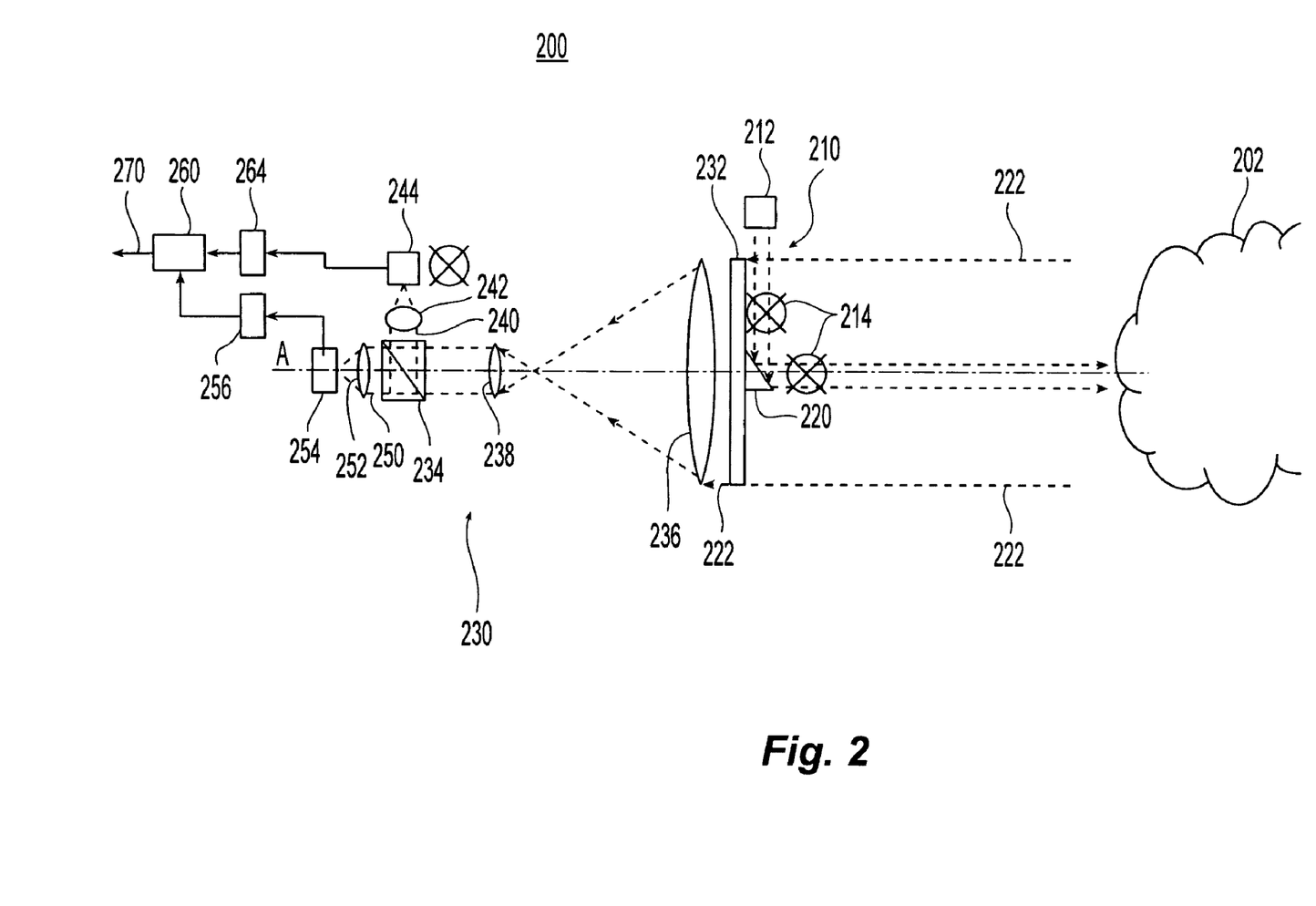
FIG. 2 shows a schematic of an optical device for the detection of airborne moisture using only linear polarization.

FIG. 2 shows a schematic of a first device 200 which employs only linear polarization. The device 200 includes an illumination portion 210 and a detection portion 230.

The illumination portion 210 includes an optical beam emitter 212 which is configured to output a linearly polarized illuminating beam 214 (denoted with a circle and cross-hatch). In one embodiment, the optical beam emitter 212 may comprise a laser, while in other embodiments it may comprise a photodiode whose output passes through a linear polarizing element. In the embodiment shown, the illumination portion 210 also includes a first polarizing reflector 220 configured to reflect the linearly polarized illuminating beam 214 along an optical illumination axis A of the device 210 and in the direction of a cloud 202.

While the device 200 is shown as directing the linearly polarized illuminating beam 214 in the direction of a cloud 202, it is understood that during use the device 200 is mounted on an aircraft which may be passing through a cloud. Also, it is noted here that the device 200 typically is configured to detect cloud ice at a range of 10 to 20 meters. As is known to those of ordinary skill in the art, the range is determined by the time delay between the emission of the laser pulse by the optical beam emitter 212 and the reception of the laser echo by the detection portion.

The linearly polarized illuminating beam 214 illuminates a volume of space in the cloud 202. In response, moisture within that instantaneous volume of space in the cloud 202 causes backscattering of illuminating beam 214, thereby creating linearly polarized backscattered light 222 which travels in the direction of the device 200.

The detection portion 230 of the device includes a window 232 configured to permit the linearly polarized backscattered light 222 to pass therethrough. In the embodiment shown, the linearly polarized backscattered light 222 first passes through a window 232 of the device 200 and towards a polarizing beam splitter 234. Before reaching the polarizing beam splitter 234, the backscattered light passes through a first lens 236 for focusing the backscattered light 222 and a collimating lens 238.

The polarizing beam splitter 234 is configured to split the linearly polarized backscattered light 222 into first component linearly polarized backscattered light 240 and second component linearly polarized backscattered light 250. The first component linearly polarized backscattered light 240 passes through a first condenser lens 242 for focusing onto a first light detector 244. Similarly, the second component linearly polarized backscattered light 250 passes through a second condenser lens 252 for focusing onto a second light detector 254. In particular, in the embodiment shown, the polarizing beam splitter 234 reflects light polarized parallel to the linearly polarized illuminating light 214 towards the first detector 244 ("parallel detector") and passes light polarized orthogonal to the linearly polarized illuminating light 214 towards the second detector 254 ("orthogonal detector").

The output of each detector 244, 254 generally is subject to additional signal processing operations 246, 256 which may include filtering and amplification, as is known to those skilled in the art. Then, the output is applied to a circuitry 260 for calculating one or more parameters which are reflective of the presence of ice in the cloud 202. In one embodiment, the circuitry 260 may comprise an application-specific integrated circuit or a processor. In another embodiment, the circuitry 260 may comprise discrete logic circuits such as comparators, adders, and the like. It is further understood that analog-to-digital converters and the like may also be included, if not already incorporated into the circuitry 260. In some embodiments, the one or more parameter may comprise a ratio of the outputs. In other embodiments, the one or more parameters may comprise a comparison of the outputs. Other, more complicated, parameters are also possible.

In the case of linear polarization, the circuitry 260 can calculate a depolarization parameter $\delta$ as simply the ratio of the intensity of the received polarization orthogonal to the transmitted polarization to intensity of the received polarization parallel to transmitted polarization.

$$\delta = \frac{I_{perpendicular}}{I_{parallel}}$$

If there is no depolarization, the received linear polarization is identical to the transmitted, and the depolarization parameter $\delta$ is zero. For complete depolarization, the parameter is one. Mixed phase clouds yield a parameter somewhere between these two extremes. For an optically thick water cloud, the depolarization will be greater than zero, with the number increasing as multiple scattering dominates. Distinguishing a pure water cloud from a pure ice cloud requires establishing a threshold value of a parameter that varies with cloud thickness. After comparing with such a parameter, the circuitry 260 may output one or more signals 270 to indicate the decision, signal an alarm, or the like.

Circular polarization may be used in an airborne water droplet and ice crystal sensor to help distinguish between a water cloud and an ice cloud If a cloud is composed of water droplets, the basic "sense" of circular polarization does not change, regardless of the presence of multiple scattering. If the illuminating beam is right hand circularly polarized ("RHC"), the backscattered light from a pure water cloud will have only a left hand circularly polarized ("LHC") component. Multiple scattering will degrade the polarization purity of this light by introducing a linear component that makes the light elliptically polarized. But when the light is decomposed into its Stokes components, the circular component still will be left hand circularly polarized, never right circularly polarized, as long as the cloud is completely composed of liquid water droplets.

If the cloud is completely composed of ice crystals, the circular component of the Stokes vector will be right hand circularly polarized, regardless of the presence of other linear components that are introduced by multiple scattering or by birefringence of the ice crystals. Hence, if the fourth component of the Stokes vector is monitored, the presence of a pure ice crystal cloud will show a distinct, unambiguous "flip" in the direction, or sense, of circular polarization.

Figure 3:
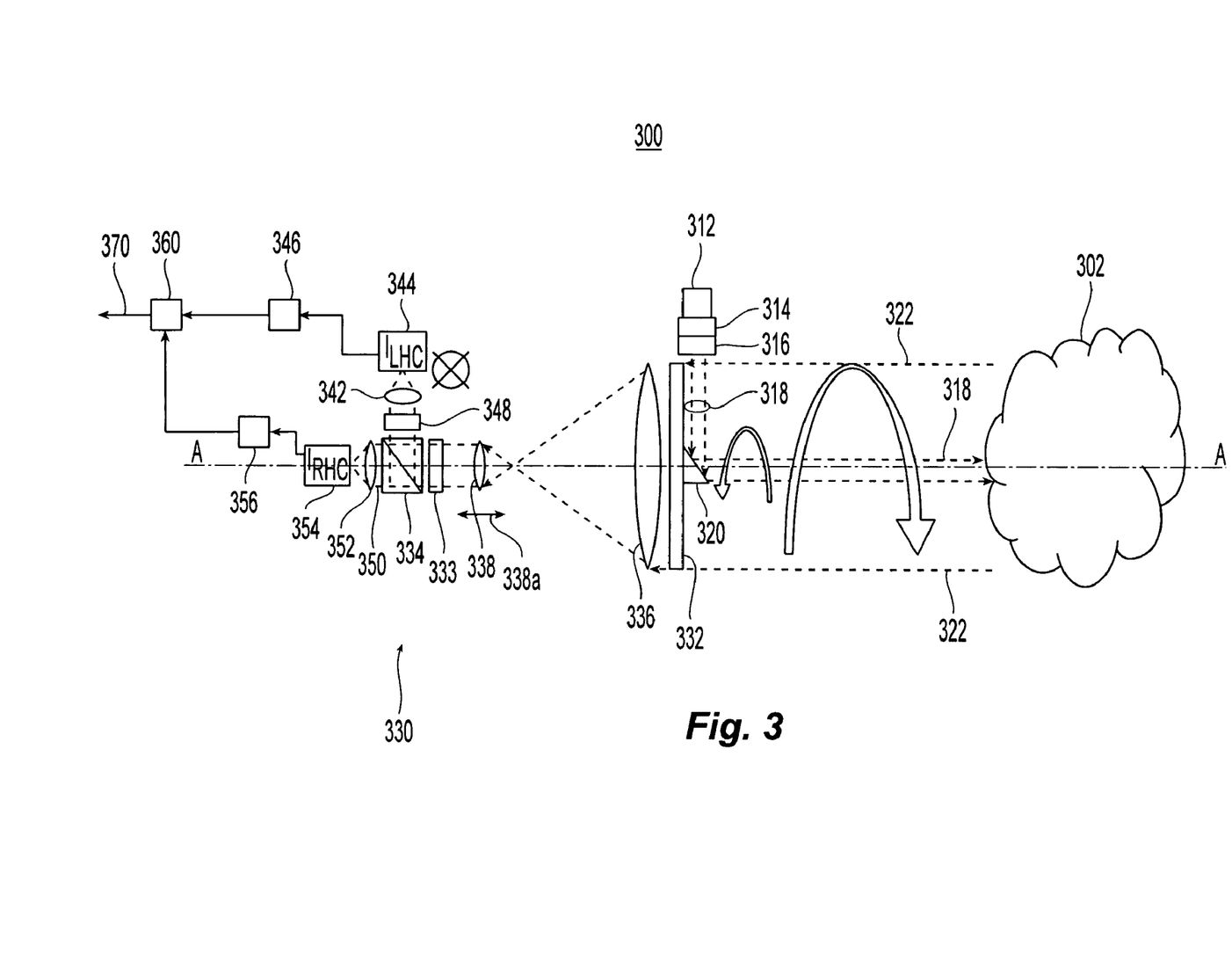
FIG. 3 shows a schematic of an optical device for the detection of airborne moisture using circular polarization.

FIG. 3 shows a schematic of a device 300 in accordance with the present invention which employs circularly polarized light. The device 300 is similar to device 200 except for the presence of two linear polarizers 314, 348 and circular polarizing elements 316, 333 in the form of two quarter wave plates, whose function is described below. Like device 200, device 300 includes an illumination portion 310 and a detection portion 330.

The illumination portion 310 includes an optical beam emitter 312 which outputs a first light beam. The optical beam emitter 312 may comprise a laser or, alternatively, a light emitting diode whose output is linearly polarized. An illumination-side linear polarizer 314 helps ensure high polarization purity by receiving the first light beam (which may already be linearly polarized) from the optical beam emitter 312 and outputting a linearly polarized illuminating beam. In one implementation, the illumination-side linear polarizer 314 is model number DP-050-NIR2-2, available from Meadowlark Optics, of Frederick, Colo. (USA).

In some embodiments, the linearly polarized illuminating beam is first reflected by an illumination-side polarizing beam splitter cube 315 (see FIG. 4) before being presented to a first circular polarization element 316. In one implementation, the illumination-side polarizing beam splitter cube 315 is model number BB-050-IR2, available from Meadowlark Optics, of Frederick, Colo. (USA).

The first circular polarization element 316 receives the linearly polarized illuminating beam and transforms it into a circularly polarized illuminating beam 318. In one embodiment, the circular polarization element 316 comprises a quarter wave plate which transforms the linearly polarized light into circularly polarized light. In one implementation, the quarter wave plate 316 is model number CP-050-905, available from Meadowlark Optics, of Frederick, Colo. (USA).

In the embodiment shown, the illumination portion 310 also includes a reflector 320 configured to reflect the circularly polarized illuminating beam 318 along an optical illumination axis A of the device 310 and in the direction of a cloud 302. The reflector 320 must not alter the circular polarization. In one embodiment, the reflector comprises a standard protected gold mirror which, in one prototype, produced a circular polarization purity of better than 400:1.

While the device 300 is shown as directing the circularly polarized illuminating beam 318 in the direction of a cloud 302, it is understood that during use the device 300 is mounted on an aircraft which may be passing through a cloud. Also, it is noted here that the device 300 typically is configured to detect cloud ice at a range of 10 to 20 meters. As is known to those of ordinary skill in the art, the range is determined by the duration and timing of pulses applied to the optical beam emitter 312, and the timing associated with the detection portion 330.

The circularly polarized illuminating beam 318 illuminates a volume of space in the cloud 302. In response, moisture within that instantaneous volume of space in the cloud 302 causes backscattering of the circularly polarized illuminating beam 318, thereby creating circularly polarized backscattered light 322 which travels in the direction of the device 300.

The detection portion 330 of the device includes a window 332 configured to permit the circularly polarized backscattered light 322 to pass therethrough. In the embodiment shown, the circularly polarized backscattered light 322 first passes through the window 332 and towards a second circular polarization element 333, which may also be a quarter wave plate.

The second circular polarization element 333 receives the circularly polarized backscattered light that has passed through the window 332 and outputs linearly polarized backscattered light. Before reaching the second circular polarization element 333, the backscattered light 322 passes through a first lens 336 for focusing the backscattered light 322 and a collimating lens 338.

In one embodiment, the collimating lens 338 is mounted in an adjustable length lens tube, such as part no. SM1V10 available from Thor Labs of Newton, N.J., USA. The adjustable length lens tube has a threaded first portion which travels in an axial direction relative to a second portion. This allows an axial position of the collimating lens along the sensor's optical axis A to be adjusted, as depicted by the double-headed arrow 338a. This feature allows a user to control the distance between the collimating lens 338 and the first lens 336, thereby configuring the device 300 to efficiently collect scattered light at its nominal working range, which in one embodiment is from about 10 to about 20 meters. It is understood that the collimating lens 238 in device 200 may likewise be axially adjustable.

A detection-side polarizing beam splitter cube 334 is configured to split the linearly polarized backscattered light from the second circular polarization element 333 into first component linearly polarized backscattered light 340 and second component linearly polarized backscattered light 340.

In one embodiment, the first component linearly polarized backscattered light 340 passes through a detection-side linear polarizer 348 and a first condenser lens 342 which focuses the first component linearly polarized backscattered light 340 onto a first light detector 344. Similarly, the second component linearly polarized backscattered light 350 passes through a second condenser lens 352 which focuses the former onto a second light detector 354.

The output of each light detector 344, 354 generally is subject to additional signal processing operations 346, 356 which may include filtering and amplification, as is known to those skilled in the art. Then, the output is applied to circuitry 360 for calculating one or more parameters which are reflective of the presence of ice in the cloud 302. In one embodiment, the circuitry 360 may comprise an application-specific integrated circuit or a processor. In another embodiment, the circuitry 360 may comprise discrete logic circuits such as comparators, adders, and the like. It is further understood that analog-to-digital converters and the like may also be included, if not already incorporated into the circuitry 360. In some embodiments, the one or more parameters may comprise a ratio of the outputs. In other embodiments, the one or more parameters may comprise a comparison of the outputs. Other, more complicated, parameters are also possible. After calculating any such parameters, the circuitry 360 may output one or more signals 370 to indicate the decision, signal an alarm, or the like.

Figure 4:
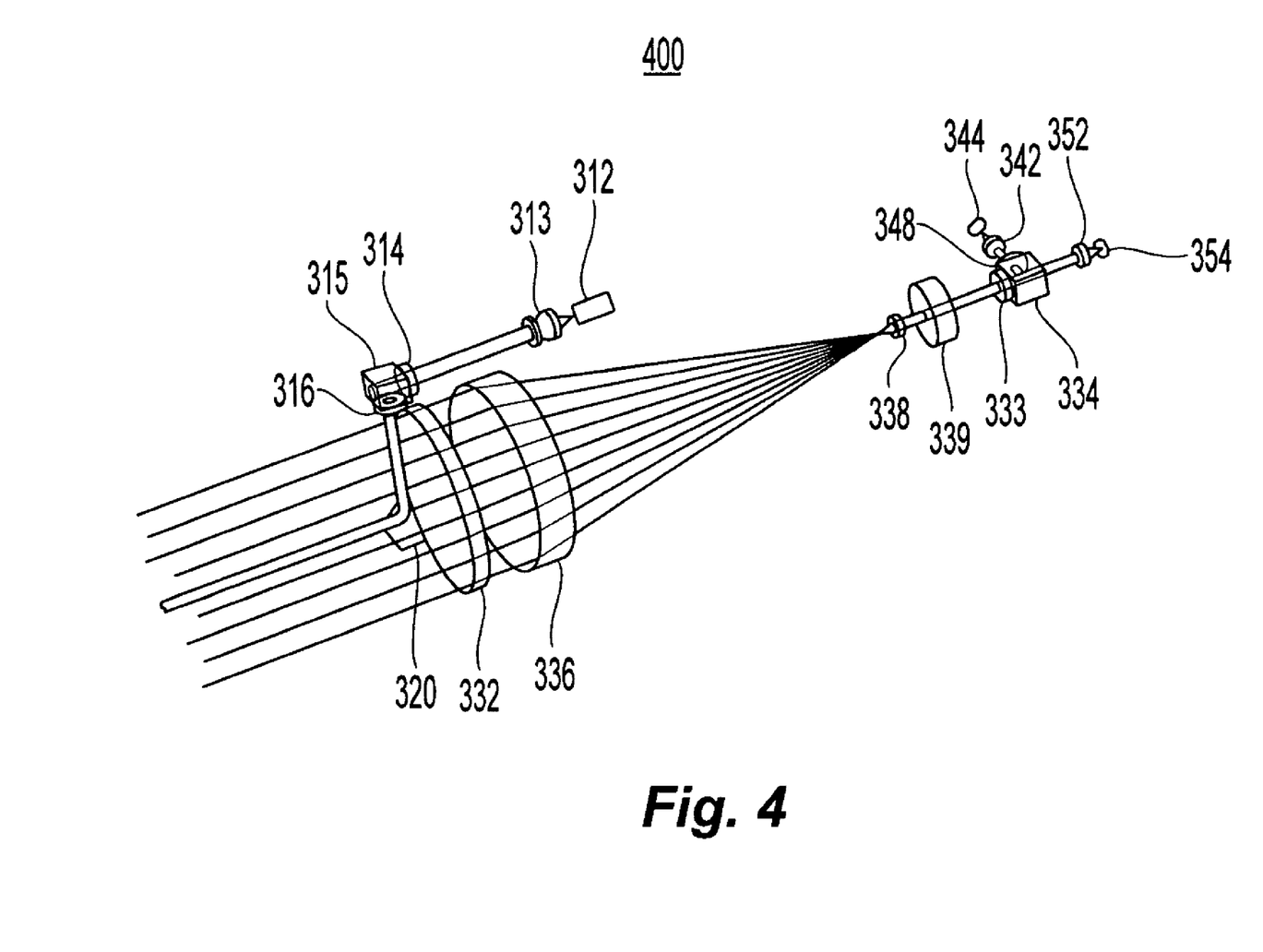
FIG. 4 shows an exemplary layout corresponding to the optical device schematic of FIG. 3.

FIG. 4 shows an exemplary layout of a device 400 having substantially the same components as the airborne cloud ice detection device 300 depicted in FIG. 3. As seen in FIG. 4, a circularizing and collimating optic 313 may be used to couple light from the optical beam emitter 312 to the illumination-side linear polarizer 314. In addition, the illumination-side polarizing beam splitter cube 315 redirects the output of the illumination-side linear polarizer 314 towards reflector 320.

In one embodiment, the detection-side polarizing beam splitter cube 334 has a high contrast ratio for the transmitted beam (200:1) and a low contrast ratio (20:1) for the reflected beam. Since there is always a significant amount of received light with the same polarization as the transmitted light, this polarization is passed into the reflected channel ("LHC Channel") which has the low contrast ratio and is associated with first light detector 344. The orthogonal polarization that characterizes the presence of ice crystals passes into the direct channel ("RHC Channel") which has the high contrast ratio and is associated with the second light detector 354. The rationale is that high contrast is needed to accurately detect the presence of ice, which is likely to be less prevalent in clouds than liquid water. To compensate for the low contrast ratio in the "water" channel, the additional linear polarizer 348 is added to improve the ratio. Polarization measurements of a prototype system show a contrast ratio of better than 400:1 for the "ice" detecting (RHC) channel and better than 50:1 for the "water" detecting (LHC) channel. The channels are labeled as "water detecting" and "ice detecting" according to the channel that is expected to show the greater signal for a pure water droplet cloud and for a pure ice crystal cloud. These correspond to the "parallel" and "perpendicular" polarization channels, respectively, in the linear polarization scheme. It is understood, however, that detection-side linear polarizer 348 may not be needed if the contrast ratio for the LHC channel were higher.

For a thin water cloud, if the illuminating beam is right circularly polarized ("RHC"), the reflected light is left circularly polarized ("LHC"). Furthermore, if the quarter wave plate 333 is set properly (i.e. the "fast axis" of the plate is at a 45° angle to the polarization axis of the beam splitter cube), all of the received light is converted into linearly polarized light that enters the first detector 344 ("LHC").

In the device 300, any light that is not circularly polarized will still pass through the second circular polarization element 333 and will be broken into its corresponding parallel and perpendicular linear components. Therefore, the device 300 may still exhibit "crosstalk" between channels when multiple scattering is present. However, the direction of circular polarization is a key parameter that will not change if the cloud is composed entirely of water.

The fourth Stokes component V (which specifies the direction of circular polarization) can be derived from the signal in the two detectors 344, 354 using the relation:

$$V \equiv \frac{I_{RHC} - I_{LHC}}{I_{total}}$$

$$= \frac{I_{RHC} - I_{LHC}}{I_{RHC} + I_{LHC}}$$

$$= \frac{(I_{RHC} - I_{LHC})^2}{I_{RHC}^2 - I_{LHC}^2}$$

$$= \frac{\left(\frac{I_{RHC}}{I_{LHC}} - 1\right)^2}{\left(\frac{I_{RHC}}{I_{LHC}}\right)^2 - 1}$$

Wherein $I_{LHC}$ and $I_{RHC}$ correspond to the intensities received at detectors 344, 354, respectively. In terms of the familiar depolarization ratio δ for a linear system, $$V = \frac{(\delta - 1)^2}{\delta^2 - 1}$$

As the equation for V shows, the sign of V changes when δ (the ratio of the two orthogonal signals) passes through one. If the two signals are passed to the inputs of a comparator, the transition from water to ice can trigger a simple indicator, such as a light or an audible alarm, to indicate the presence of airborne ice crystals. Furthermore, the comparator can be altered to create a threshold alarm for whatever condition (pure ice or mixed phase) is desired. For example, if only a pure ice crystal cloud is considered hazardous to flight, the value of V should be ~0.27, and the comparator can alarm only when the ratio of the RHC to LHC signals (δ) exceeds 1.7.

One simple method of setting the threshold for the alarm is to alter the relative angle between the fast axis of the quarter wave plate 333 and the detection-side polarizing beam splitter cube 334 about the optical axis of the sensor. The quarter wave plate 333 converts circular polarization into two equal, orthogonal components of linear polarization, regardless of the orientation of the plate's fast axis. However, the relative orientation of the detection-side polarizing beam splitter cube 334 after the quarter wave plate 333 controls the relative proportion of components of linearly polarized light that enter the two detectors 344, 354. For example, in the case of a cloud composed entirely of ice crystals, the ratio of the signal at the RHC detector 354 (ice detecting channel) to the signal in the LHC detector 344 (water detecting channel) is 1.7, provided the fast axis of the quarter wave plate 333 is at 45° to the axis of the detection-side polarizing beam splitter cube 334. If the angle of the fast axis is rotated towards the LHC detector 344, the linear polarization axis of the light that enters the detection-side polarizing beam splitter cube 334 will also rotate and produce two nearly equal signals in the two detectors 344, 354. In such a case, the circuitry 360 may comprise a very simple, inexpensive comparator that sends a threshold alarm whenever the signals are equal, indicating the presence of an ice cloud. The exact rotation angle of the quarter wave plate 333 should be determined empirically, but the principle is the same, regardless of the desired threshold.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. An airborne water droplet and ice crystal sensor, comprising:
   an illumination portion comprising:
      a first optical beam emitter configured to output a light beam;
      a first linear polarizer configured to receive the light beam and output a linearly polarized illuminating beam;
      a first circular polarization element configured to receive the linearly polarized illuminating beam and output a circularly polarized illuminating beam; and
   a detection portion comprising:
      a window configured to permit circularly polarized backscattered light to pass therethrough;
      a second circular polarization element configured to receive the circularly polarized backscattered light that has passed through the window and output linearly polarized backscattered light;
      a first polarizing beam splitter configured to split the linearly polarized backscattered light into a first component linearly polarized backscattered light and a second component linearly polarized backscattered light;
      a first light detector configured to detect the first component linearly polarized backscattered light and output a first signal in response thereto;
      a second light detector configured to detect the second component linearly polarized backscattered light and output a second signal in response thereto; a
      a second linear polarizer interposed between the first polarizing beam splitter and the first light detector, the second linear polarizer configured to further linearly polarize the first component linearly polarized backscattered light, prior to detection by the first detector; and
      a processor configured to receive the first and second signals output by respective first and second light detectors, and calculate at least one parameter reflective of an ice condition, based on said first and second signals.

2. The airborne water droplet and ice crystal sensor according to claim 1, further comprising:
   a reflector configured to reflect the circularly polarized illuminating beam along an optical illumination axis of the sensor.

3. The airborne water droplet and ice crystal sensor according to claim 1, wherein:
   the first circular polarization element comprises a first quarter wave plate; and
   the second circular polarization element comprises a second quarter wave plate.

4. The airborne water droplet and ice crystal sensor according to claim 1, wherein:
   the first optical beam emitter comprises a light emitting diode whose output is linearly polarized.

5. The airborne water droplet and ice crystal sensor according to claim 1, wherein:
   the first optical beam emitter comprises a laser.

6. The airborne water droplet and ice crystal sensor according to claim 1, further comprising:
- a first lens interposed between the window and the second circular polarization element;
- a second lens interposed between the first linear polarizer and the first light detector; and
- a third lens interposed between the second linear polarizer and the second light detector.

7. The airborne water droplet and ice crystal sensor according to claim 6, further comprising:
- a collimating lens interposed between the first lens and the second circular polarization element.

8. The airborne water droplet and ice crystal sensor according to claim 7, wherein:
- a position of the collimating lens is axially adjustable along an optical axis of the sensor.

9. The airborne water droplet and ice crystal sensor according to claim 6, wherein:
- the second and third lenses are condenser lenses.

10. The airborne water droplet and ice crystal sensor according to claim 1, further comprising:
- a reflector configured to reflect the circularly polarized illuminating beam along an optical illumination axis of the sensor.

11. The airborne water droplet and ice crystal sensor according to claim 10, further comprising:
- a first lens interposed between the window and the second circular polarization element;
- a second lens interposed between the first linear polarizer and the first light detector;
- a third lens interposed between the second linear polarizer and the second light detector; and
- a collimating lens interposed between the first lens and the second circular polarization element.

12. The airborne water droplet and ice crystal sensor according to claim 11, wherein:
- a position of the collimating lens is axially adjustable along an optical axis of the sensor.

13. A method of detecting ice crystals in a cloud from an aircraft, the method comprising:
- emitting a circularly polarized illuminating beam within a cloud;
- receiving circularly polarized backscattered light from moisture within the cloud, in response to the illuminating beam;
- passing said circularly polarized backscattered light through a circular polarizer to form linearly polarized backscattered light;
- splitting said linearly polarized backscattered light into first component linearly polarized backscattered light and second component linearly polarized backscattered light;
- optically detecting said first component linearly polarized backscattered light and outputting a first detection signal in response thereto, and optically detecting said second component linearly polarized backscattered light and outputting a second detection signal in response thereto, and
- calculating at least one parameter reflective of the presence of ice in the cloud, based on said first and second detection signals; wherein:
- the first component linearly polarized backscattered light is subject to additional linear polarization prior to optical detection.

\* \* \* \* \*